No. 755,145. PATENTED MAR. 22, 1904.
E. LEBACH.
PORTABLE BIN FOR DUST OR REFUSE.
APPLICATION FILED AUG. 1, 1903.
NO MODEL.

WITNESSES:
C. Heymann
R. Winter

INVENTOR.
Elias Lebach
BY
ATTORNEY.

No. 755,145. Patented March 22, 1904.

UNITED STATES PATENT OFFICE.

ELIAS LEBACH, OF COLOGNE, GERMANY, ASSIGNOR TO THE FIRM OF SALUBRITA, GESELLSCHAFT MIT BESCHRÄNKTER HAFTUNG, OF COLOGNE, GERMANY.

PORTABLE BIN FOR DUST OR REFUSE.

SPECIFICATION forming part of Letters Patent No. 755,145, dated March 22, 1904.

Application filed August 1, 1903. Serial No. 167,881. (No model.)

*To all whom it may concern:*

Be it known that I, ELIAS LEBACH, manager, a citizen of the German Empire, residing at Hohenstaufenring 16, Cologne, Rhineland, Prussia, Germany, have invented a new and useful Portable Bin for Dust, Refuse, or other Purposes, of which the following is a specification.

This invention relates to a portable bin for dust, refuse, and other purposes having its cover fastened to a movable carrying bail or bow.

The essential feature of the invention consists in the fact that the cover in the closed position of the bin is secured or held by a bar or hook. The locking-bar is formed as a carrying-handle and is pivoted at one end to the carrying-bail. At its other end, which is provided with an elongated eye, it engages a hook arranged on the wall of the bin, the vertical part of said hook being bent inwardly.

Figure 1:
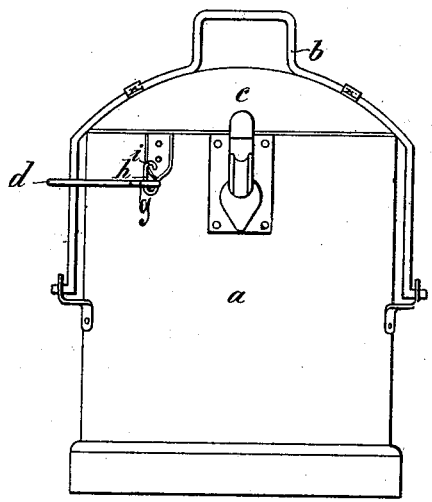
Figure 2:
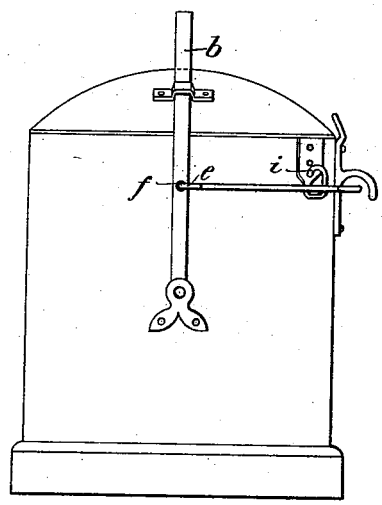
Figure 3:
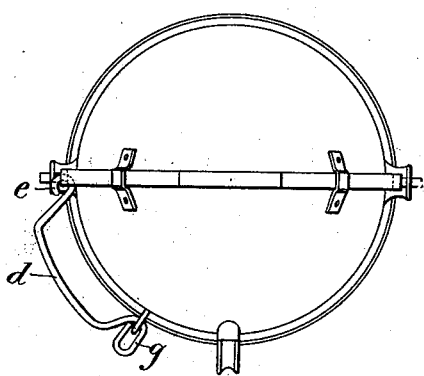
Figure 4:
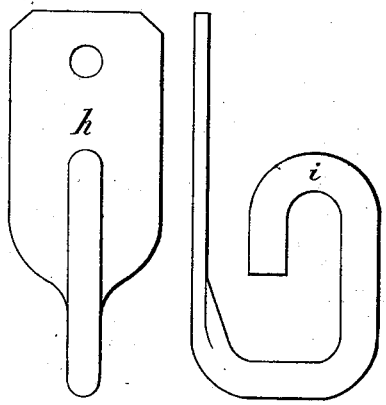

In the annexed drawings, which show one form of the invention, Figure 1 is a front view of the bin; Fig. 2, a side view, and Fig. 3 a plan view thereof; Fig. 4, a detail view.

To the bin or vessel $a$ is pivoted or otherwise resiliently connected the carrying bow or bail $b$, to which the cover $c$ is attached. To the bow $b$ is fastened a bar or hook $d$, formed as a handle and having an eye or the like $e$, adapted to pass through a hole $f$ in the bow $b$. The other end of the bar $d$ is provided with an elongated eye or loop $g$, which is inserted in a hook $h$ in order to prevent movement of the bail $b$. In the ordinary position, in which the bar $d$ serves only as a closing-hook, the latter is placed with its eye $g$ in the hook $h$ on the vessel $a$. In order to open the bin, the bow $d$ is pushed against the wall of the bin in such a manner that the eye $g$ can be disengaged from the hook $h$; but if it is desired to use the handle $d$ for carrying purposes the eye will be engaged into the inwardly-bent part $i$ of the hook $h$, by which the handle $d$ is prevented from springing out of said hook $h$. By this arrangement the advantage is gained of being able to arrange a handle at or near the top of the vessel which does not interfere with the freedom of movement of the carrying-bail.

I declare that what I claim is—

1. The combination with a bin of a carrying-bail, a cover attached thereto, a hook fixed to the wall of the bin and a locking-handle engaging said hook at one end and the bail at the other end to prevent movement of the latter substantially as described.

2. The combination with a bin of a pivoted carrying-bail, a cover attached thereto, a hook fixed to the wall of the bin, and having its vertical part bent inwardly and a locking-bar in the form of a handle connected at one end to the said bail and at the other provided with an elongated eye adapted to engage the aforesaid hook, substantially as described.

In testimony whereof I affix my signature in presence of two witnesses.

ELIAS LEBACH.

Witnesses:
W. FOHRR. V. LYNDKER,
CARL H. SCHMITT.